US008400345B2

(12) United States Patent
Maier

(10) Patent No.: US 8,400,345 B2
(45) Date of Patent: Mar. 19, 2013

(54) MULTIMEDIA ASSEMBLY WITH A PROGRAMMABLE UNIVERSAL REMOTE CONTROL UNIT AND METHOD OF PROGRAMMING A REMOTE CONTROL UNIT

(75) Inventor: Ferdinand Maier, Obertum am See (AT)

(73) Assignee: FM Marketing GmbH, Obertrum Am See (AT)

( * ) Notice: Subject to any disclaimer, the term of this patent is extended or adjusted under 35 U.S.C. 154(b) by 748 days.

(21) Appl. No.: 12/548,759

(22) Filed: Aug. 27, 2009

(65) Prior Publication Data

US 2010/0060506 A1 Mar. 11, 2010

(30) Foreign Application Priority Data

Sep. 9, 2008 (DE) ......................... 10 2008 046 493

(51) Int. Cl.
*H04L 17/02* (2006.01)

(52) U.S. Cl. .... 341/176; 341/173; 340/10.5; 340/12.23; 340/12.28

(58) Field of Classification Search .................. 341/176
See application file for complete search history.

(56) References Cited

U.S. PATENT DOCUMENTS

| | | | | |
|---|---|---|---|---|
| 4,626,848 | A | 12/1986 | Ehlers | |
| 6,476,825 | B1 * | 11/2002 | Croy et al. | 715/716 |
| 6,813,619 | B2 * | 11/2004 | Devara | 1/1 |
| 6,909,378 | B1 * | 6/2005 | Lambrechts et al. | 340/4.32 |
| 2008/0174467 | A1 * | 7/2008 | Drimusz et al. | 341/176 |

* cited by examiner

*Primary Examiner* — Khai M Nguyen
(74) *Attorney, Agent, or Firm* — Senniger Powers LLP

(57) ABSTRACT

A multimedia assembly with a programmable universal remote control unit, which is configured to "learn" remote control codes from original remote control units, and which provides that remote control signals are transmitted from original remote control units to the control unit where they are analyzed, decoded, and newly encoded; and wherein newly encoded signals are then transmitted from the control unit to the universal remote control unit that is to be programmed, where they are stored in a memory.

4 Claims, 6 Drawing Sheets

FIG. 4

USR: n

USR: 4

USR: 3

USR: 2

USR: 1

| | DEVICE 1 | | DEVICE 2 | | DEVICE 3 | | DEVICE n | |
|---|---|---|---|---|---|---|---|---|
| F1: | C1 | T1 | C1 | T1 | C1 | T1 | C1 | T1 |
| F2: | C2 | T2 | C2 | T2 | C2 | T2 | C2 | T2 |
| F3: | C3 | T3 | C3 | T3 | C3 | T3 | C3 | T3 |
| F4: | C4 | T4 | C4 | T4 | C4 | T4 | C4 | 0 |
| F5: | C5 | 0 | C5 | 0 | C5 | 0 | C5 | 0 |
| F6: | C6 | 0 | C6 | T5 | C6 | 0 | C6 | 0 |
| F7: | C7 | 0 | C7 | 0 | C7 | T5 | C7 | 0 |
| F8: | C8 | 0 | C8 | 0 | C8 | : | C8 | T5 |
| F9: | C9 | T5 | : | : | : | : | : | : |
| : | : | : | : | : | : | : | Cn | |
| : | : | : | Cn | | : | : | | |
| : | : | : | | | Cn | | | |
| : | : | : | | | | | | |
| Fn | Cn | | | | | | | |

MULTIMEDIA ASSEMBLY WITH A PROGRAMMABLE UNIVERSAL REMOTE CONTROL UNIT AND METHOD OF PROGRAMMING A REMOTE CONTROL UNIT

REFERENCE TO RELATED APPLICATIONS

This application claims priority from German application DE 10 2008 046 493.7, the entire disclosure of which is incorporated herein by reference.

BACKGROUND

The invention relates to a multimedia assembly with a programmable universal remote control unit and a method of programming a remote control unit.

Remote control units and methods of this type are known from U.S. Pat. No. 4,626,848 A. This publication describes a programmable universal remote control unit, which receives, analyzes, decodes and stores remote control codes transmitted by one or more original remote control units, so that the remote control unit to be programmed "learns" the corresponding codes of the original remote control units. The programmable remote control unit then is a copy of the original remote control units in terms of its functions.

Programming a universal remote control unit of this type is cumbersome in practice, however, because to program the universal remote control unit, all keys must be pressed in sequence for each device.

The analysis, decoding and re-encoding of the signals from the original remote control units also requires considerable expenditure in terms of computing power, memory and other components in the universal remote control unit, which increases its cost and the amount of energy it consumes during operation.

Today, remote control units for electronic systems such as television receivers, satellite receivers, video recorders, CD players, music systems, etc. have a large number of keys and key combinations, each of which is assigned a specific code which is usually transmitted as an encoded infrared signal. Remote control units having more than 40 keys are not unusual.

Normally, each device is supplied with its own remote control unit in which the code combinations that conform to the associated device are stored. In practice, therefore, any given household will have a number of remote control units for controlling different devices, which many users find excessive and impractical.

The obvious solution is to use a universal remote control unit as specified in the above cited U.S. Pat. No. 4,626,848 A with which several different devices can be remotely controlled. Codes corresponding to the different devices can be stored in this universal remote control unit. The device to be controlled can be selected via a selection function, such as by pressing a selection key or actuating a multistage sliding switch, whereupon the respective code is assigned to the individual keys of the universal remote control unit.

One problem with known universal remote control units is that the user must use the selection function to determine which device will be controlled. In U.S. Pat. No. 4,626,848 A, this is accomplished using special device selection keys. Frequently, the user then does not know which device the remote control is set for, allowing unintentional functions to be initiated. For example, if a user watching television has selected the satellite receiver on the remote control unit in order to select a television channel, and then wishes to adjust the volume on the television, he must first select the television on the remote control unit before he can adjust its volume. If he presses the corresponding volume adjustment keys without making this selection beforehand, these keys may be assigned to other functions for the still selected satellite receiver, and an incorrect function can be initiated.

Another problem is that some devices offer a wide range of functions which some users do not wish to use at all. Some remote control units therefore have an extremely large number of keys to which specific functions are assigned, with the result that incorrect activation will again trigger undesired functions.

To solve this problem, EP 1185922 B1 proposes a multimedia system for scrollable crosspoint navigation on a user interface, which comprises two displaceable bars, each comprising at least two object fields which overlap in one focus field. The object fields of one bar are subordinate to those of the other bar. The object fields lying in the focus field are selected via input means and are combined with one another to transmit a control signal. However, this requires that the "user interface," i.e., a central control device, can control all connected devices, because the "input means," such as a remote control unit, can control only the "user interface" and not the individual connected devices. If individual connected devices are exchanged for other devices, or if additional new devices are connected, the central control device must be exchanged or adjusted accordingly.

SUMMARY OF THE INVENTION

It is therefore desirable to devise a multimedia system having a universal remote control unit for controlling a plurality of different devices, which has the smallest possible number of keys and which is easy to program and easy to operate. The universal remote control unit should also be as uncomplicated as possible.

This object is attained with the characterizing features specified herein. Advantageous embodiments of and further improvements on the invention are specified in the claims.

The fundamental idea of the invention is that the universal remote control unit is programmed in cooperation with a central control unit and a display screen. When programming the universal remote control unit, the user is instructed on the screen to activate preset function keys on an original remote control unit. The resulting transmitted signal is received, analyzed and encoded by the central control unit, and is then sent by the central control unit as an encoded signal to the universal remote control unit, where it is stored. It can be directly or indirectly assigned to specific keys on the universal remote control unit, as will be described in greater detail in what follows. Once the universal remote control unit has been programmed, the original remote control unit is no longer necessary.

A bidirectional communication connection therefore exists between the universal remote control unit and the control unit, preferably via infrared signals.

To decrease the number of keys on the universal remote control unit, it is provided that certain functions of the devices to be remotely controlled are called up indirectly in cooperation with a menu system on the control unit, and not directly via an individual key on the universal remote control unit. The universal remote control unit uses an infrared signal to call up a menu system in the control unit, which the user then uses to select the desired function for the corresponding device along with the assigned remote control code in the memory. By pressing a confirmation key on the universal remote control unit, the corresponding remote control code is transmitted from the memory of the universal remote control unit to the device to be remotely controlled, thereby activating the desired function. Thus only a small number of keys are required on the universal remote control unit, wherein it can be expedient to initiate certain basic functions that are very frequently required directly and indirectly via special keys on the universal remote control unit.

BRIEF DESCRIPTION OF THE FIGURES

In what follows, the invention will be specified in greater detail within the context of an exemplary embodiment, in reference to the attached set of drawings. The drawings show:

FIG. 4 a diagram illustrating the principle of a memory organization system, detailing the programming process.

DETAILED DESCRIPTION OF PREFERRED EMBODIMENTS

Figure 1:
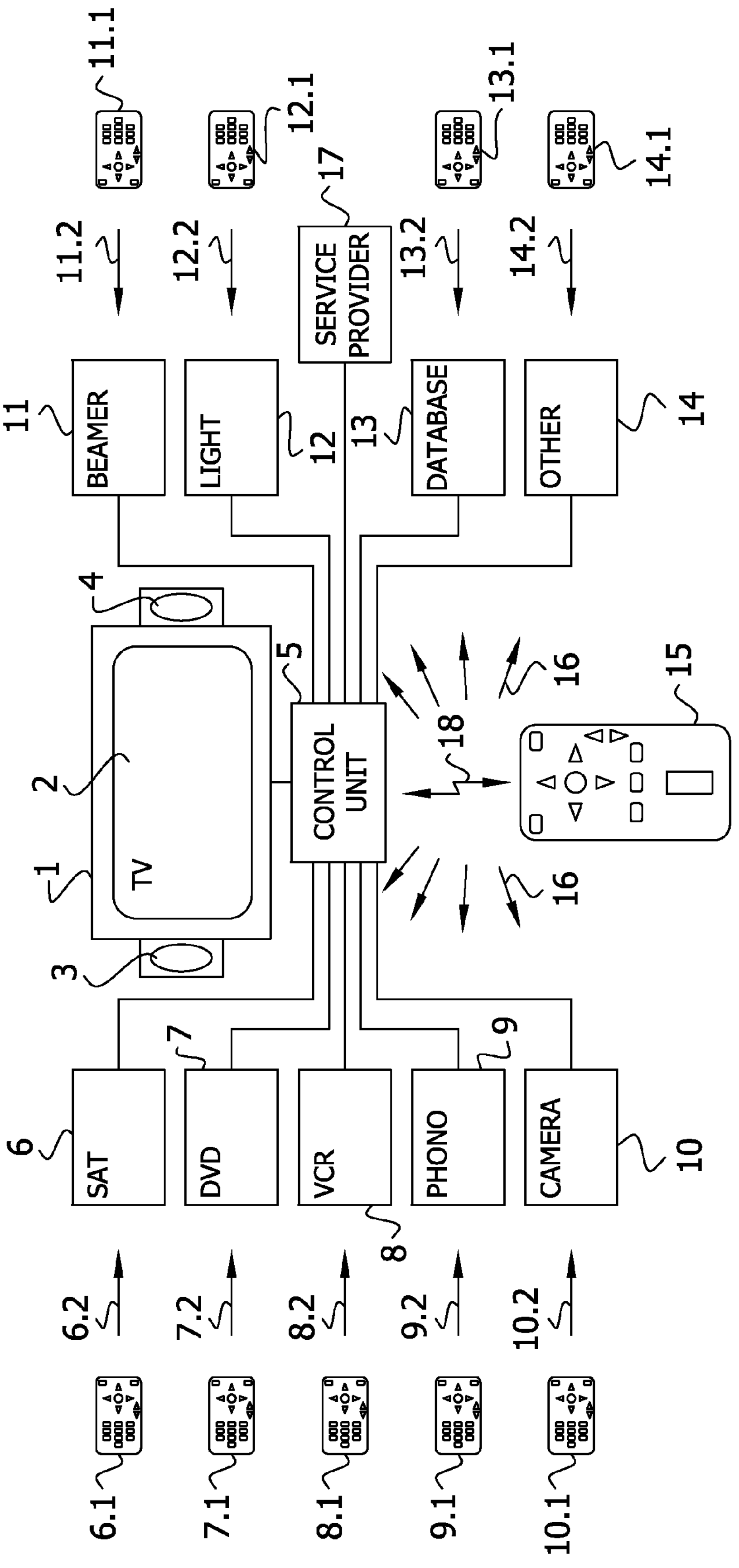
FIG. 1 an example of a multimedia system with a central control unit and a universal remote control unit according to the invention, in its status prior to programming the universal remote control unit.

FIG. 1 shows a multimedia assembly with a television receiver 1, which has a screen 2 and two speakers 3 and 4. The television receiver 1 is connected to a central control unit 5, which can be a modified set-top-box, for example. Various accessory devices are connected to the central control unit 5, such as a satellite receiver 6, a DVD player 7, a video recorder 8, a music system 9, a video camera 10, and other devices, such as a so-called beamer 11, a light control unit 12, a storage medium 13, such as a hard drive, for example, and other remotely controllable devices 14, such as a door opener, an air conditioning system, a heating system, etc.

In the basic setup, each of these devices 6 through 14 is equipped with its own remote control unit 6.1 through 14.1 which supplies control signals to the assigned device, as indicated by corresponding arrows 6.2 through 14.2.

All of these device-specific remote control units 6.1 through 14.1 will be replaced by one universal remote control unit 15, with which all devices can then be controlled, as indicated by the arrows 16.

In addition to the listed devices 6 through 14, the central control unit 5 can also be connected to an external service provider 17, from which various services can be received. These may include possible Internet access or an Intranet connection.

As is obvious from FIG. 1, the nine individual remote control units for the corresponding devices shown in this example are too many for practical use, thus it would be highly advantageous to eliminate all of these remote control units 6.1 through 14.1 and replace them with a single universal remote control unit 15.

For this purpose, as will be described in what follows, a number of functions of a universal remote control unit are transferred to the central control unit 5, wherein a bidirectional communication link exists between the central control unit 5 and the universal remote control unit 15, as is indicated by an arrow 18. This is preferably an infrared connection, however other communication links are also conceivable, for example radio, ultrasound, or the like.

The universal remote control unit 15 and the central control unit 5 have corresponding transmitting/receiving units, such as infrared transmitting and receiving diodes and their drive circuits, for example, which are known in the prior art and are thus not presented here in greater detail.

Figure 2:
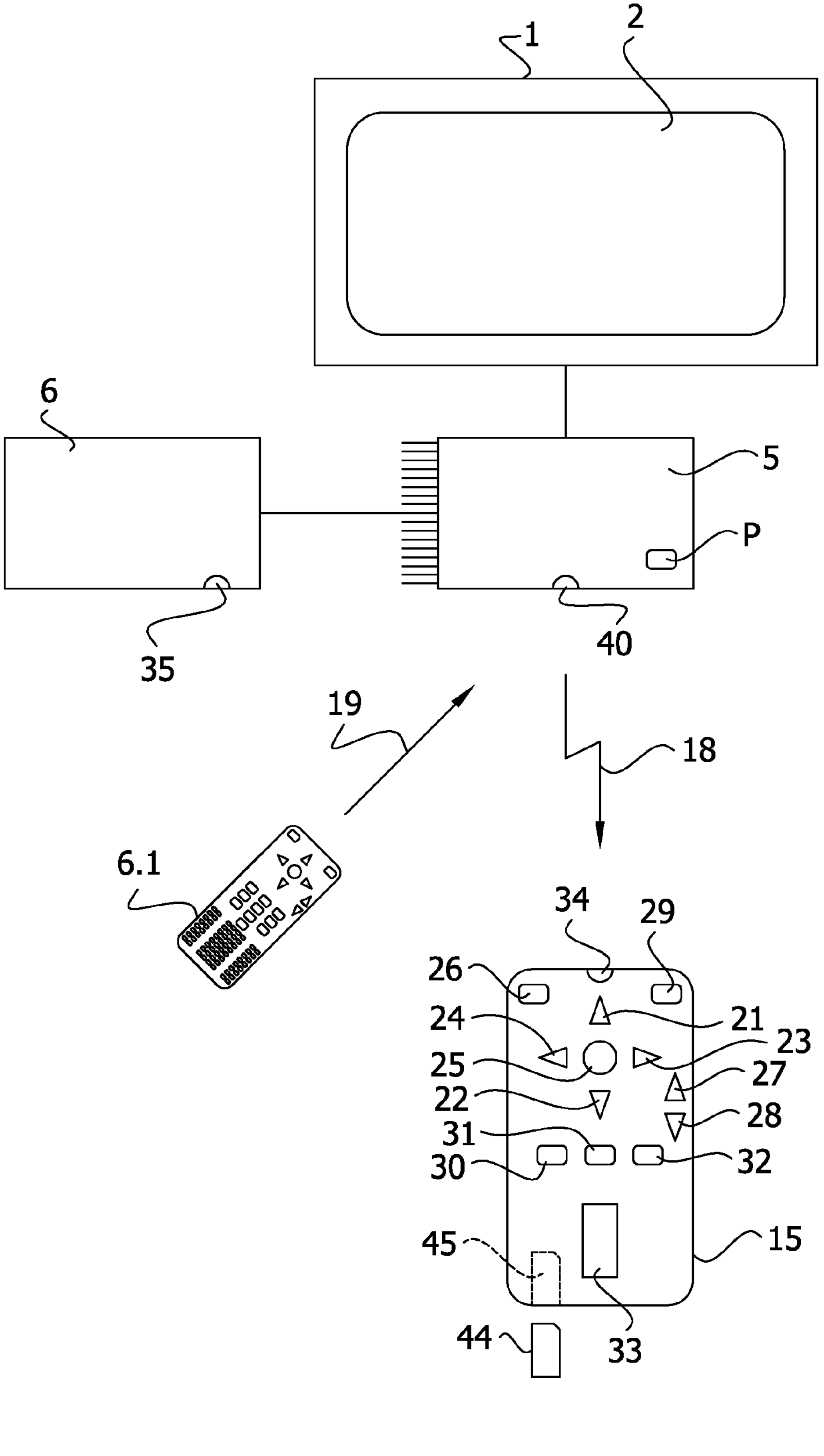
FIG. 2 a diagram illustrating the principle of the programming process.
Figure 3:
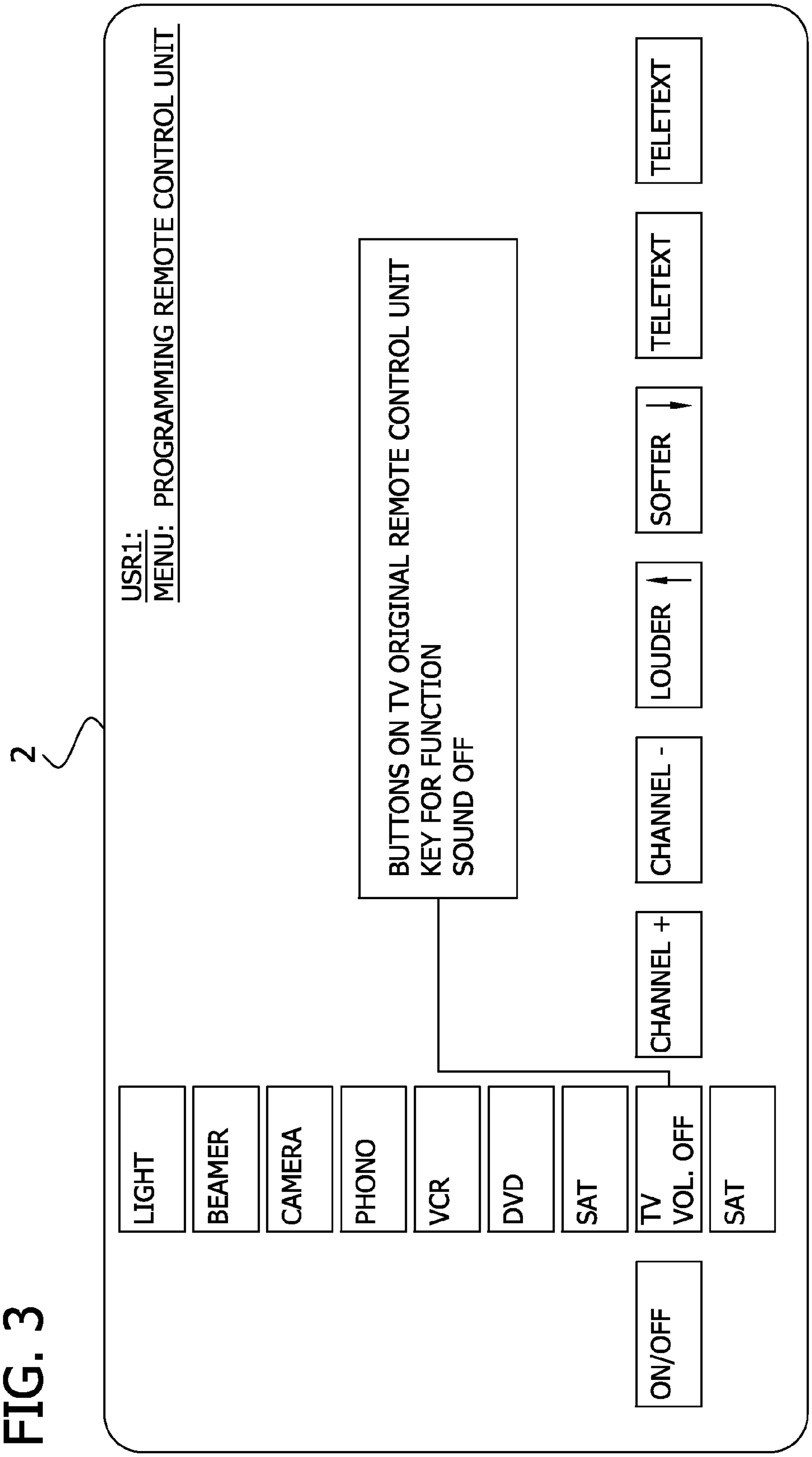
FIG. 3 a diagram illustrating the principle of a menu system, detailing the programming process.

FIGS. 2 through 4 illustrate the process of programming the universal remote control unit 15, using the example of the device 6 of FIG. 1, which in this case is a satellite receiver, to which the remote control unit 6.1 is assigned.

The operating mode "programming" is called up on the central control unit 5 by pressing a key "P" (FIG. 2).

A menu as illustrated in FIG. 3 then appears on the screen 2, displaying the devices that are connected to the control unit 5, one of which can be selected using control keys (21, 22 and 25) on the universal remote control unit 15. The control unit 5 is able to recognize the connected devices via a "plug-and-play" function, for example. It is also possible, however, for the control unit 5 only to recognize and report that a new unknown device has been connected to a specific port, and to ask the user to identify the device; this is accomplished via a menu-controlled input on the universal remote control unit 15.

The user is then asked on the screen 2 by the central control unit 5 to press predetermined function keys in sequence on the original remote control unit 6.1. As the user follows the instructions, the original remote control unit 6.1 transmits a correspondingly encoded signal to the central control unit 5, as indicated by the arrow 19 (FIG. 2). This signal is received by the control unit 5, where it is analyzed, decoded and newly encoded, and is then transmitted as an encoded signal to the universal remote control unit 15, as indicated by the arrow 18, where it is stored as a remote control code. The analysis, decoding and re-encoding, which involve a large number of computations, are therefore performed in the central control unit, which is equipped with a more powerful processor than the universal remote control unit. In this manner, all remote control codes (C1 through Cn in FIG. 4) assigned to the selected device are stored in sequence in the universal remote control unit 15. This process is repeated until all functions of the original remote control unit 6.1 desired by the user have been transferred. The user may choose to transfer those functions he wishes to use, and to skip over those functions he does not wish to use.

As the storage medium for the memory of the universal remote control unit 15, a so-called SIM card 44 can be provided, which can be inserted into a SIM card reader unit 45 contained in the universal remote control unit 15. This removable storage medium offers the advantage that if a defective universal remote control unit needs to be replaced, it is no longer necessary to perform all the programming again, but only to exchange the SIM card 44.

The universal remote control unit 15 can also contain an identification unit 33, such as a fingerprint reading device, which can be used to identify different users and personalize the universal remote control unit, in that for each user who is input, a specific key sequence is retrieved. This allows an optional assignment to the respective user (USR1 through USRn in FIG. 4), in which the user is identified in advance via the identification unit, for example a fingerprint reading device 33 (FIG. 2). This allows certain devices (e.g., Internet access) and/or certain functions (e.g., delete function) to be blocked for individual users, as the remote control codes for these are not stored for certain users, and therefore cannot be retrieved.

During the programming process, users can assign the received signal to a specific key (T1 through Tn in FIG. 4) on the universal remote control unit 15 by pressing one of the keys on the universal remote control unit 15. The signal and the assignment are then stored in the universal remote control unit 15.

It is clear from FIG. 2 that the original remote control unit 6.1 has a far greater number of keys than the universal remote control unit 15. Thus not every key on the original remote control unit 6.1 can be assigned a corresponding key on the universal remote control unit 15.

To enable all functions of the original remote control unit 6.1 to be retrieved, it is provided that at least selected codes for predetermined keys of the original remote control unit 6.1 are stored only in indirect assignment to special keys, and are later retrieved during operation controlled by the universal remote control unit 15 in connection with the central control unit 5 and a menu system.

Critical for this purpose are "positioning keys" for moving a cursor or selecting certain fields in a menu system, namely keys for UP (21) DOWN (22), RIGHT (23) and (LEFT), and a selection key 25 and a key for the BACK (26) function. Each field of the menu system is assigned a specific address in the memory 44. Additional keys for certain special functions, such as a key 27 for "LOUD" and a key 28 for "SOFT," with which the volume can be adjusted directly without calling up a menu, may be provided but are not absolutely necessary. An additional key 29 can be provided for the "ON/OFF" function. Finally, additional keys 30, 31 and 32 can be provided, which can be assigned specific functions based upon device and/or based upon user.

FIG. 4 schematically illustrates the organization of the memory 44 in which the remote control codes of the remote control unit are stored based upon the user and the respective device. For each user USR:1 through USR:n, a separate storage area is established, which is selected via the identification device 33 (FIG. 2). For each user, a table or a section of a table is stored, which contains the corresponding codes C1 through Cn (for functions F1 through Fn) for each device (device 1 through device n), and for some codes also contains an assignment of the code to a specific key.

In the example of the device 1 of FIG. 4, the codes C1, C2, C3 and C4 are each assigned directly to the keys T1, T2, T3 and T4, for example to the keys 26, 29, 30 and 31 of the universal remote control unit 15 of FIG. 2. The codes C5 through C8 are not assigned to a specific key, therefore a "0" is shown at the corresponding location in FIG. 4. The code C9 is assigned to a key T5, for example the key 32 on the universal remote control unit 15 of FIG. 2.

Such assignments are stored in a corresponding manner for all other devices, and for the corresponding users.

Figure 6:
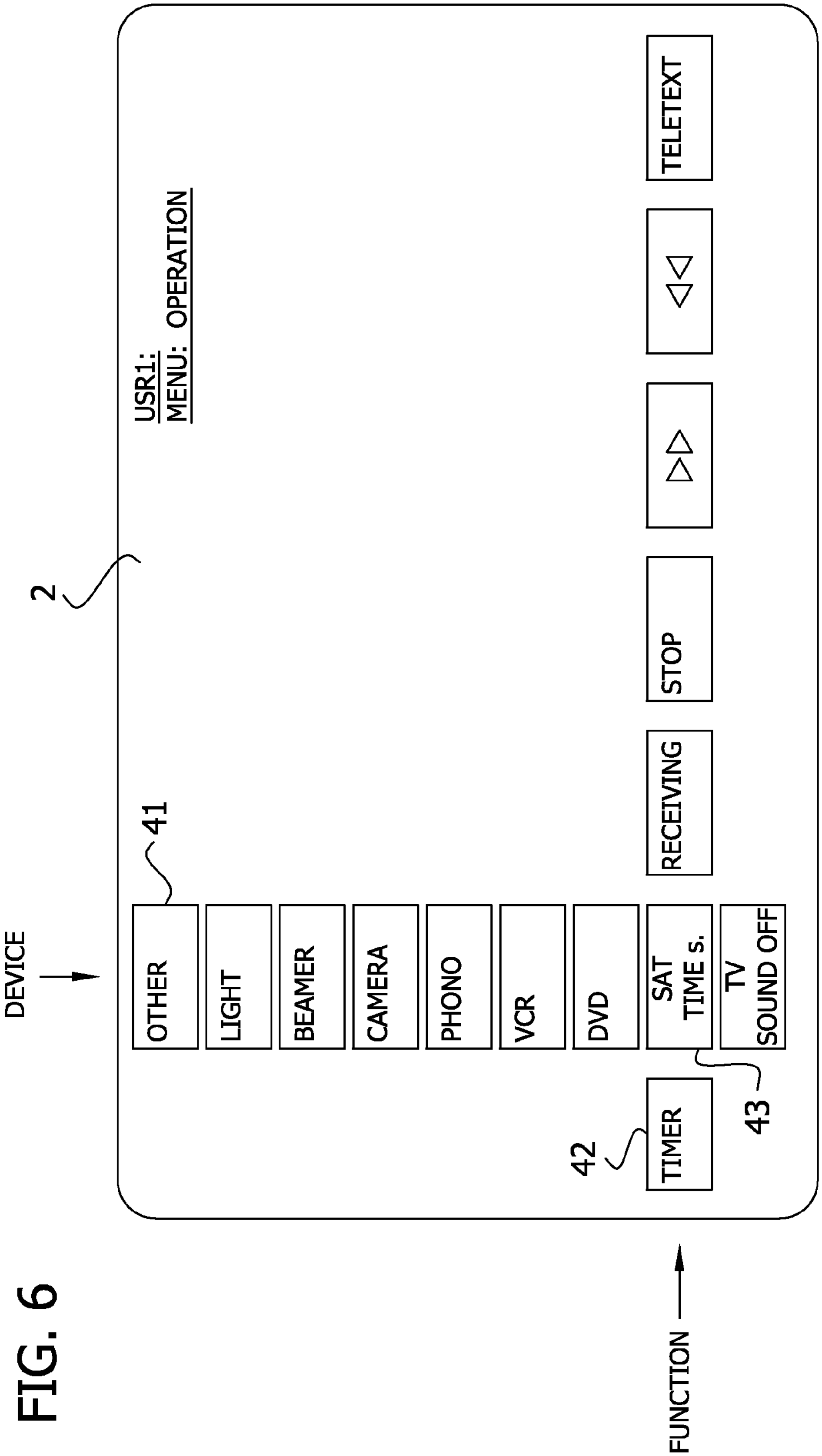
FIG. 6 is a schematic depiction of an exemplary menu component of the assembly of the invention.

From this system of organization it follows that, in selecting the device 1, for example, when the user USR1 presses one of the keys T1 through T5, the corresponding code C1, C2, C34, C4 or C9 is transmitted directly by the universal remote control unit 15, while for the remaining codes C5 through C8 and C10 through Cn, assignment is not direct to an individual key, but is only "indirect." The corresponding memory addresses and thus also the codes can be targeted using the aforementioned positioning keys, in other words especially keys 21 and 22 of the universal remote control unit 15 of FIG. 2, and the corresponding code will be transmitted by pressing the confirmation key 25. With the positioning keys 21, 22, 23 or 24, the user can thus "move" vertically and horizontally through the memory and can target individual memory addresses, which are displayed to him simultaneously on the screen 2 in a menu (FIG. 6). By pressing the positioning keys on the universal remote control unit 15, a new memory address is simultaneously selected and an encoded signal is transmitted to the control unit 5, resulting in a display change in the menu system. The menu system of the control device and the memory 44 of the universal remote control unit are thus synchronized with one another. If the synchronization is lost, for example when a battery is changed, it is provided that when the menu system is called up a synchronization signal is transmitted, for example from the universal remote control unit 15 to the control unit 5, which identifies a memory address, for example.

This will be described in detail in reference to FIG. 6.

FIG. 6 shows the menu that appears on the screen 2 for normal operation, which is used to select the devices 6 through 14 that are connected to the control unit 5 (FIG. 1) and to call up their functions. This menu is activated by pressing a preset key, for example the confirmation key 25. Several fields appear in a column 41, identifying the corresponding devices. Several fields also appear in a row 42, identifying the individual functions of the corresponding devices, wherein column 41 and row 42 intersect in a focus field 43. The elements of column 41 are moved up or down using positioning keys 21 and 22, while the elements of the rows are moved to the right or left using positioning keys 23 and 24. The element located in the focus field 43 can be selected using the key 25, which causes the code that is assigned to this field or its function to be transmitted by the universal remote control unit 15, which triggers the corresponding function in the selected device. Once the desired function is selected in this manner, the menu disappears from the screen 2 and normal operation is continued.

The arrangement of the individual elements of the fields can be user-dependent, and can be selected during programming of the universal remote control unit 15.

According to one variant of the invention, the memory in which all codes, users and key assignments are stored can also be located in the control unit 5. In this case, only a very small number of codes are stored in the universal remote control unit, namely codes for the keys located on the universal remote control unit 15 with which the menu system is controlled.

In this context it should be emphasized that the term "key" or "keys" encompasses not only keys in a narrower sense, but also any other input devices, such as a contact-sensitive control surface (a so-called touch screen) with which certain commands can be executed by touching predetermined areas or by executing predefined movements of an object, such as a finger, for example, over this touch screen.

Figure 5:
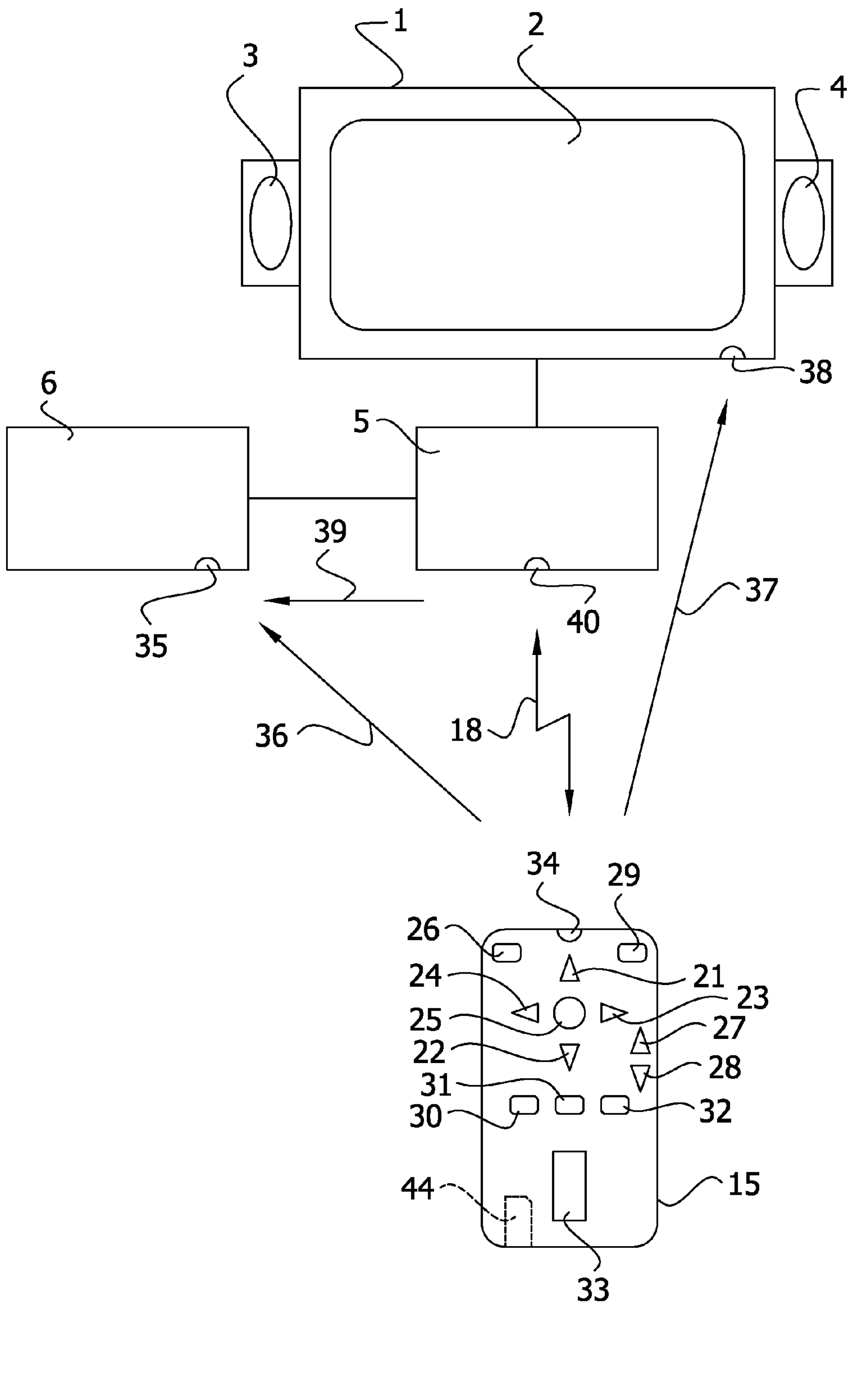
FIG. 5 a diagram illustrating the principle of operation of the universal remote control unit following programming.

Operation of the programmed universal remote control unit 15 will now be detailed in reference to FIG. 5. It is assumed that the mode of operation for the satellite receiver 6 (e.g., device 1 in FIG. 4) has already been selected using the menu system in combination with the universal remote control unit 5. For example, the key 21 can be assigned the function "change channel forward" and the key 22 can be assigned the function "change channel backward." When these keys are pressed on the universal remote control unit 15, the correspondingly encoded infrared signal is transmitted from the transmitting diode 34 of the universal remote control unit 15 to a receiving diode 36 of the satellite receiver 6, as indicated by the arrow 36.

Other functions, such as the function "volume" of speakers 3 and 4 of the television receiver 1, can be permanently assigned to certain keys, such as keys 27 and 28, independently of the selected device. When these keys are pressed, the transmitting diode 34 on the universal remote control unit 15 transmits a corresponding control signal to a receiving diode 38 of the television receiver 1, which is represented by the arrow 37, while the device 6 does not react to these signals. If the user wants the sound from the television system to play via the music system, then of course the unit can be programmed to adjust the volume of the music system using the identified keys 27 and 28.

Other functions of the activated device 6 can be assigned directly to the other keys, for example 29 through 32, allowing the user to initiate functions directly via these. Other functions of the activated device 6 cannot be initiated directly due to the small number of keys on the universal remote control unit as compared with the original remote control unit (6.1 in FIG. 1). They are instead called up via a menu system, which the user activates on the universal remote control unit 15 via a preset key, for example the confirmation key 25 or one of the keys 29 through 32. Via the communication link 18, a menu system is activated in the central control unit 5, and is displayed on the screen 2. The user can then select a specific menu item, such as the "channel search" function, in the satellite receiver using positioning keys 21 through 24, and can select this channel using the confirmation key 25. The universal remote control unit 15 then transmits the stored, encoded infrared signal directly to the corresponding device 6, as indicated by the arrow 36. Alternatively, if remote control codes are stored in the control unit 5, the remote control code can be transmitted via the communication link 18 to the universal remote control unit 15, which then transmits this to the device 6, as indicated by the arrow 36.

As an alternative, the control device 5 can also transmit the encoded signal directly to the selected device 6, as represented by the arrow 39. If the device 6 can also be controlled directly, i.e., via cable, using the central control device 5, a corresponding signal can also be transmitted via the cable.

If the user wishes to operate a different device, such as the DVD player 7 of FIG. 1, he again calls up the menu system and uses positioning keys 21 through 24 and confirmation key 25 to select the corresponding menu, after which the corresponding key loading is activated in the universal remote control unit 15, i.e., the memory area for the device 7 is addressed.

All connected devices 6 through 14 of FIG. 1 can be activated in a corresponding manner using the menu system, and the universal remote control unit 15 can be assigned the corresponding codes and key assignments.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

The invention claimed is:

1. Multimedia assembly comprising:

a control unit, to which multiple remotely controllable electronic devices can be connected, a programmable universal remote control unit, which has a receiver for receiving remote control codes and a memory for storing the remote control codes, wherein the control unit and the universal remote control unit each have a transmitting and a receiving device for bidirectional communication with one another, wherein the control unit has a device for receiving, analyzing and decoding remote control signals from original remote control units, wherein the control unit has a device for transmitting the received remote control signals to the universal remote control unit as remote control codes, wherein the universal remote control unit has a device for receiving the remote control codes transmitted by the control unit, wherein the memory of the universal remote control unit is organized in the form of a matrix and wherein all fields of the matrix can be activated using a maximum of four keys of the universal remote control unit, wherein predetermined fields of the matrix can be activated directly using special keys on the universal remote control unit, and wherein when positioning keys are activated, the universal remote control unit transmits preset signals to the control unit, which displays a menu system on a screen which is synchronized with the remote control codes of the memory.

2. Multimedia assembly according to claim 1, wherein the universal remote control has an identification device for identifying predetermined persons, and the memory has preset areas which can be accessed by the universal remote control unit once a preset user has been identified.

3. Multimedia assembly according to claim 1, wherein the memory of the universal remote control unit is a SIM card memory, which can be inserted into a SIM card reader in the universal remote control unit.

4. Method of programming a universal remote control unit by means of an original remote control unit comprising:

transmitting a remote control signal from the original remote control unit to a central control unit;

receiving, analyzing, decoding and re-encoding the received signal in the central control unit;

transmitting the newly encoded signal from the central control unit to the universal remote control unit; and storing the remote control code transmitted by the control unit to the universal remote control unit in a memory of the universal remote control unit;

wherein the universal remote control unit is the universal remote control unit of the multimedia assembly of claim 1.

* * * * *